(12) United States Patent
Soliman et al.

(10) Patent No.: US 6,640,622 B2
(45) Date of Patent: Nov. 4, 2003

(54) FEED-FORWARD OBSERVER-BASED CONTROL FOR ESTIMATING CYLINDER AIR CHARGE

(75) Inventors: Ihab S. Soliman, Warren, MI (US); Tobias John Pallett, Ypsilanti, MI (US); Jerry D. Robichaux, Riverview, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/154,299

(22) Filed: May 24, 2002

(65) Prior Publication Data

US 2002/0179050 A1 Dec. 5, 2002

Related U.S. Application Data

(62) Division of application No. 09/570,784, filed on May 13, 2000, now Pat. No. 6,460,409.

(51) Int. Cl.[7] .............................................. G01M 15/00
(52) U.S. Cl. ..................................... 73/118.2; 73/117.3
(58) Field of Search ............................... 73/116, 117.2, 73/117.3, 118.1, 118.2; 701/101, 102, 103

(56) References Cited

U.S. PATENT DOCUMENTS

| | | | | |
|---|---|---|---|---|
| 4,512,318 A | * | 4/1985 | Ito et al. ..................... 123/492 |
| 4,548,185 A | * | 10/1985 | Pozniak ................. 123/568.27 |
| 4,987,888 A | * | 1/1991 | Funabashi et al. ...... 123/406.46 |
| 4,999,781 A | * | 3/1991 | Holl et al. ................... 701/108 |
| 5,068,794 A | * | 11/1991 | Hosaka ....................... 701/104 |
| 5,069,184 A | * | 12/1991 | Kato et al. ............. 123/406.46 |
| 5,159,914 A | * | 11/1992 | Follmer et al. ............. 123/494 |
| 5,270,935 A | * | 12/1993 | Dudek et al. ................. 701/99 |
| 5,273,019 A | * | 12/1993 | Matthews et al. ...... 123/406.48 |
| 5,274,559 A | * | 12/1993 | Takahashi et al. .......... 701/103 |
| 5,293,553 A | * | 3/1994 | Dudek et al. ............... 701/102 |
| 5,297,064 A | * | 3/1994 | Bauerle ....................... 702/98 |
| 5,331,936 A | * | 7/1994 | Messih et al. .............. 123/480 |
| 5,398,544 A | * | 3/1995 | Lipinski et al. ............ 73/118.2 |
| 5,448,978 A | * | 9/1995 | Hasegawa et al. .......... 123/480 |
| 5,497,329 A | * | 3/1996 | Tang .......................... 701/104 |
| 5,537,977 A | * | 7/1996 | Hartman et al. ....... 123/406.46 |
| 5,654,501 A | * | 8/1997 | Grizzle et al. ............. 73/118.2 |
| 5,666,918 A | * | 9/1997 | Pallett et al. ............... 123/350 |
| 5,889,205 A | * | 3/1999 | Treinies et al. ............ 73/118.2 |
| 6,170,475 B1 | * | 1/2001 | Lewis et al. ........... 123/568.21 |
| 6,363,316 B1 | * | 3/2002 | Soliman et al. ............. 701/104 |

* cited by examiner

Primary Examiner—Eric S. McCall
(74) Attorney, Agent, or Firm—Allan J. Lippa; Kolisch Hartwell, P.C.

(57) ABSTRACT

A system and method for controlling an internal combustion engine to improve air/fuel ratio control using a feed-forward observer-based control strategy include estimating current and future airflow actuator positions, determining corresponding mass airflow values, and determining a future in-cylinder air charge based on a difference between the current and future mass airflow values. In one embodiment, the difference between current and future mass airflow estimates is used as a feed-forward term and combined with a sensed or measured value generated by a mass airflow sensor prior to being processed using a manifold filling model to predict the future cylinder air charge. In another embodiment, the current and future mass airflow estimates are processed using the manifold filling model with the results used to generate a future delta cylinder air charge that is subsequently used as a feed-forward term and combined with a measured air charge corresponding to a measured mass airflow processed by the manifold filling model.

15 Claims, 8 Drawing Sheets

FEED-FORWARD OBSERVER-BASED CONTROL FOR ESTIMATING CYLINDER AIR CHARGE

This application is a divisional of application Ser. No. 09/570,784, filed on May 13, 2000, now U.S. Pat. No. 6,460,409 entitled "Feed-Forward Observer-Based Control For Estimating Cylinder Air Charge", assigned to the assignee of the parent application, and incorporated herein by reference.

TECHNICAL FIELD

The present invention relates to systems and methods for cylinder air charge estimation used in controlling an internal combustion engine.

BACKGROUND ART

Precise air/fuel ratio control is an important factor in reducing feed gas emissions, increasing fuel economy, and improving driveability. Current internal combustion engine designs use various temperature, pressure, and flow sensors in an attempt to precisely control the amount of air and fuel, and thus the air/fuel ratio, for each cylinder firing event. However, due to various sensor limitations such as response time and being located away from the combustion chamber of the cylinder, it is difficult to precisely measure and coordinate or synchronize the air and fuel quantities which are actually combusted in the cylinder. Acceptable control strategies have been developed to compensate for various sensor limitations under steady-state operating conditions. Effort is now being focused on improving these strategies to provide more accurate air/fuel ratio control during transient as well as steady-state operating conditions.

Electronically controlled throttle valve actuators have been used to improve transient air/fuel ratio control by providing increased control authority over airflow. By eliminating the mechanical linkage between an accelerator pedal and the throttle valve, the engine controller can control throttle valve position to deliver the proper airflow for current driver demand and operating conditions.

Airflow is typically measured using a mass airflow (MAF) sensor positioned upstream of the throttle valve. Intake air travels past the MAF sensor, through the throttle valve and into the intake manifold where it is distributed to a bank of cylinders. Intake air enters a cylinder upon the opening of one or more intake valves. Fuel may be mixed with the intake air prior to entering the cylinder or within the cylinder for direct injection applications. The response characteristics of current MAF sensors coupled with the delay time associated with throttle valve positioning, transit time of the air mass between the MAF sensor and the cylinder, and response time of the fuel injector, make it difficult to accurately determine the precise quantity of air and fuel in the cylinder.

Various prior art approaches have attempted to improve air/fuel ratio control and compensate for one or more of the above factors. For example, one approach attempts to synchronize throttle valve positioning commands and fuel injection commands in the crank-angle domain so that throttle valve movement is prohibited after air flow measurement. Another approach delays throttle valve movement to allow time for the fuel system to react. One strategy which provides a future estimate of cylinder air charge linearly extrapolates a current airflow measurement for a future fuel injection event. However, this method assumes air charge changes at a constant rate and does not compensate for airflow sensor filtering effects which lead to an attenuated and delayed response.

SUMMARY OF THE INVENTION

It is an object of the present invention to improve air/fuel ratio control using feed-forward observer-based controls to provide an estimate for future cylinder air charge during a future fuel injection event.

In carrying out the above object and other objects, features, and advantages of the present invention, a system and method for controlling an internal combustion engine having an electronically controlled airflow actuator, such as a throttle valve or intake/exhaust valves, include predicting current and future positions of the airflow actuator using an actuator model with the future position preferably corresponding to a subsequent injection of fuel into the cylinder, generating a delta mass air flow prediction based on current and future air flow estimates, and estimating air charge in the cylinder for the subsequent injection of fuel based on the delta mass air flow prediction. In one embodiment, the delta mass air flow prediction is used as a feed-forward term which is added to the current mass airflow sensor reading with the result processed by an intake manifold filling model to provide a future estimate of in-cylinder air charge. In another embodiment, the current and future mass airflow estimates are processed by an intake manifold filling model to produce corresponding cylinder air charge estimates. The difference of the estimates is then used as a feed-forward term that is combined with the air charge calculated using the intake manifold filling model with the sensed mass airflow as an input.

The present invention includes a number of advantages relative to prior art control strategies. For example, improved air charge estimation using the present invention allows more precise air/fuel ratio control. A priori knowledge of airflow control actuator position provides advanced notice via system modeling of how the cylinder air charge will be effected and allows improved air/fuel ratio control, especially during transient conditions. This may lead to reduced feedgas emissions and a corresponding reduction in the necessary size of the catalyst. A faster control system response without inducing instability or noise using the present invention may also result in improved driveability.

The above advantages and other advantages, objects, and features of the present invention, will be readily apparent from the following detailed description of the best mode for carrying out the invention when taken in connection with the accompanying drawings.

BEST MODE(S) FOR CARRYING OUT THE INVENTION

Figure 1:
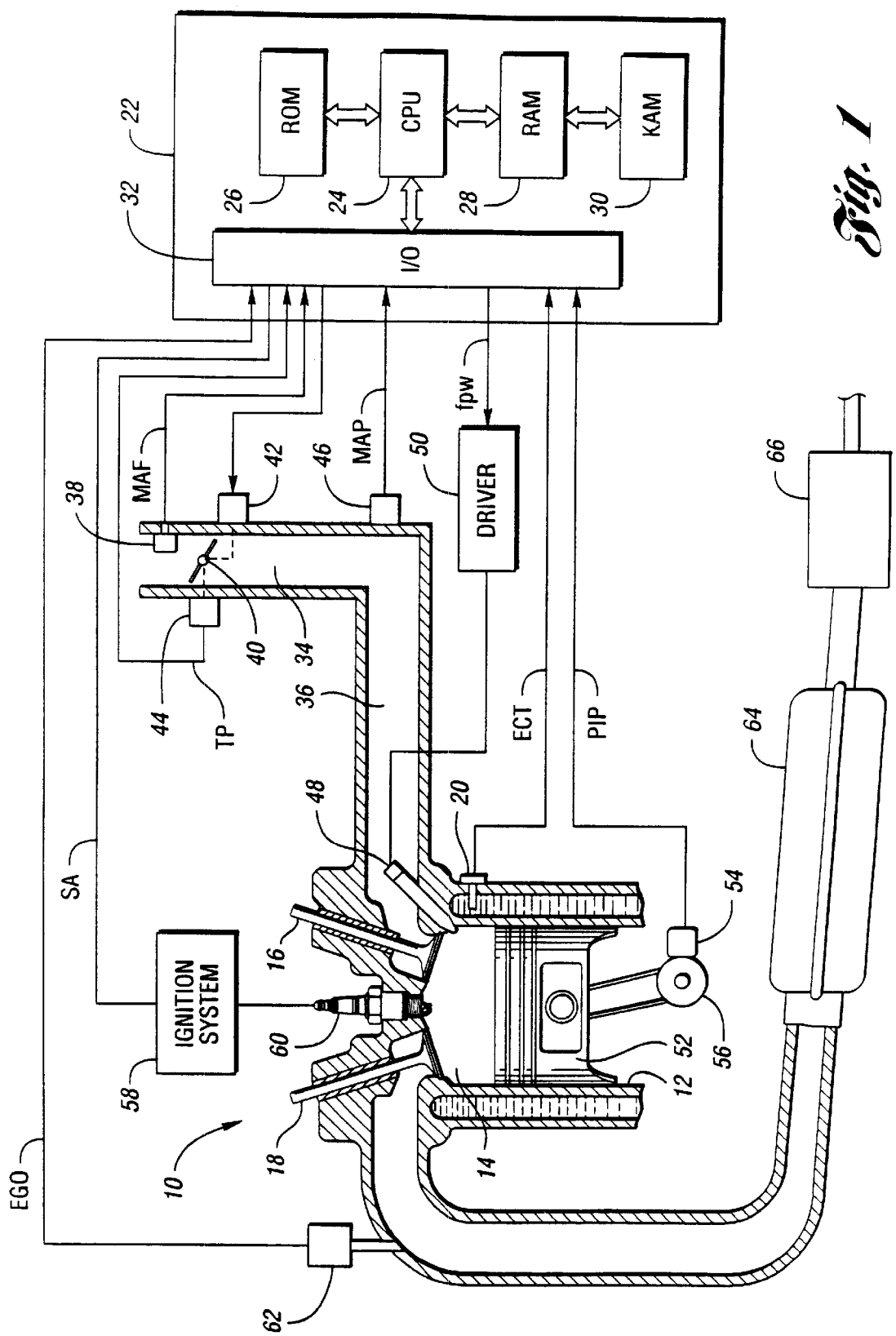
FIG. 1 is a block diagram illustrating one embodiment of an engine control system using cylinder air charge estimation with feed-forward observer-based control according to the present invention.

A block diagram illustrating one embodiment of an engine control system for an internal combustion engine according to the present invention is shown in FIG. 1. While a direct injection application is depicted in FIG. 1, the present invention is equally applicable to conventional port or throttle body injection systems as well. Similarly, while the present invention is described primarily with reference to an electronically controlled throttle to provide airflow control, the present invention may also be applied to various other types of airflow actuators such as cylinder intake/exhaust valves used in variable cam timing and variable valve timing applications with appropriate adjustments to the various models.

System 10 is preferably an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators which operate the intake valves 16 and exhaust valves 18, while only including a single engine coolant temperature sensor 20.

In one embodiment, the present invention includes a mechanical variable cam timing device of conventional design used to alter the timing of intake valves 16 and/or exhaust valves 18 to provide airflow control. In an alternative embodiment, intake valves 16 and/or exhaust valves 18 are controlled by variable valve timing actuators, such as electromagnetic actuators, as known in the art. One preferred embodiment of the present invention uses an electronically controlled throttle for airflow control as described in detail below.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known memory devices such as PROMs, EPROMs, EEPROMs, flash memory, or any other electric, magnetic, optical, or combination memory device capable of storing data, some of which represents executable instructions, used by microprocessor 24 in controlling the engine. Microprocessor 24 communicates with the various sensors and actuators via an input/output (I/O) interface 32.

In operation, air passes through intake 34 where-it may be distributed to the plurality of cylinders via an intake manifold, indicated generally by reference numeral 36. System 10 preferably includes a mass airflow sensor 38 which provides a corresponding signal (MAF) to controller 22 indicative of the mass airflow. In preferred embodiments of the present invention, a throttle valve 40 is used to modulate the airflow through intake 34 during certain operating modes. Throttle valve 40 is preferably electronically controlled by an appropriate actuator 42 based on a corresponding throttle position signal generated by controller 22. A throttle position sensor 44 provides a feedback signal (TP) indicative of the actual position of throttle valve 40 to controller 22 to implement closed loop control of throttle valve 40.

As will be appreciated by those of ordinary skill in the art, the present invention may also be used in unthrottled or throttleless engines where airflow may be controlled using appropriate valve timing. Whether or not the engine includes a physical throttle, such as throttle valve 40, the engine may be operated in various unthrottled modes. Such operation reduces pumping losses and increases engine efficiency which may result in improved fuel economy. Throttleless engines may include those having variable valve timing (VVT) where intake and exhaust valves are. controlled electronically using electromagnetic actuators rather than a conventional cam arrangement. Likewise, engines having variable cam timing mechanisms may be operated at wide open throttle to reduce pumping losses with air flow control provided by modifying the cam timing. The present invention is also applicable to engine configurations with conventional valve timing mechanisms which may also operate at wide open throttle in various modes depending upon the current driver demand and engine operating conditions.

As illustrated in FIG. 1, a manifold absolute pressure sensor 46 may be used to provide a signal (MAP) indicative of the manifold pressure to controller 22. Air passing through intake manifold 36 enters combustion chamber 14 through appropriate control of one or more intake valves 16. As described above, intake valves 16 and exhaust valves 18 may be controlled directly or indirectly by controller 22 for variable valve timing or variable cam timing applications, respectively. Alternatively, intake valves 16 and exhaust valves 18 may be controlled using a conventional camshaft arrangement. A fuel injector 48 injects an appropriate quantity of fuel in one or more injection events for the current operating mode based on a signal (FPW), generated by controller 22 and processed by driver 50.

As illustrated in FIG. 1, fuel injector 48 injects an appropriate quantity of fuel in one or more injections directly or indirectly into combustion chamber 14. Control of the fuel injection events is generally based on the position of piston 52 within cylinder 12. Position information is acquired by an appropriate sensor 54 which provides a position signal (PIP) indicative of rotational position of crankshaft 56.

According to the present invention, the air/fuel ratio may be more precisely controlled by providing an estimate of cylinder air charge for a future injection event. Once an appropriate air/fuel ratio is determined based on a desired engine torque and current operating conditions, an appropriate quantity of fuel is determined based on the estimated cylinder air charge to more accurately control the air/fuel ratio. Preferably, the cylinder air charge and fuel are determined for two PIP events ahead of the current event. Because the PIP events are based on crank angle, timing between events will vary based on the rotational speed (RPM) of the engine. Preferably, one or more airflow actuators are controlled to synchronize the predicted or estimated cylinder air charge with the scheduled fuel injection event. In throttled applications, air flow may be controlled using the throttle valve in combination with control of valve timing for intake and/or exhaust valves.

The desired fuel flow is achieved during by appropriate signals generated by controller 22 for fuel injectors 48 to inject an appropriate quantity of fuel in one or more injections directly or indirectly into each combustion chamber 14. Depending upon the particular application, fuel quantity may also be determined or adjusted to account for fuel film or wall wetting which ultimately affects the amount of fuel actually delivered to the cylinder. At the appropriate time during the combustion cycle, controller 22 generates a spark signal (SA) which is processed by ignition system 58 to control spark plug 60 and initiate combustion within chamber 14. Preferably, spark is maintained at MBT, i.e., the timing that produces maximum torque for a given amount of air and fuel, whenever possible because these conditions generally result in better fuel economy.

Controller 22 (or a conventional camshaft arrangement) controls one or more exhaust valves 18 to exhaust the combusted air/fuel mixture through an exhaust manifold. An exhaust gas oxygen sensor 62 provides a signal (EGO) indicative of the oxygen content of the exhaust gases to controller 22. This signal may be used to adjust the desired air/fuel ratio, or control the operating mode of one or more cylinders. The exhaust gas is passed through the exhaust manifold and through a catalytic converter 64 and in some applications a $NO_x$ trap 66 before being exhausted to atmosphere.

Figure 2:
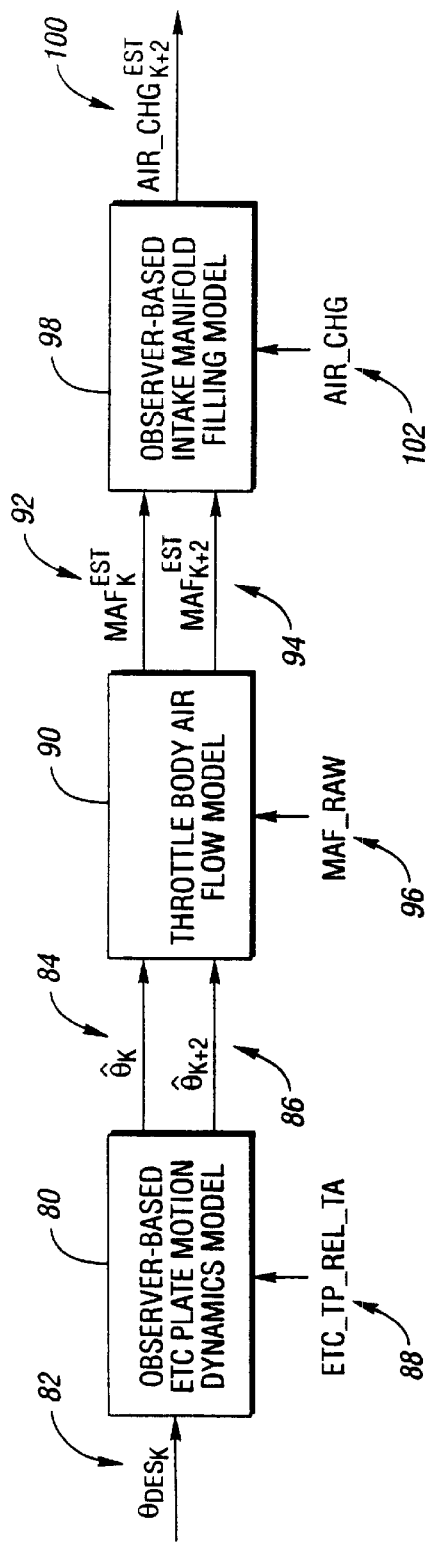
FIG. 2 is a simplified block diagram illustrating operation of a system or method for controlling an engine according to the present invention.

FIG. 2 provides a simplified block diagram illustrating operation of a system or method for future in cylinder air charge estimation according to the present invention. A dynamic model 80 of a closed-loop airflow actuator system is used recursively to generate estimates for current and future actuator positions. In this example, model 80 processes a current desired throttle angle 82 using observer-based electronic throttle control (ETC) plate motion dynamics model 80 to generate a current estimate 84 of throttle angle position and a future estimate 86 of throttle angle position. In a preferred embodiment, future throttle angle position 86 corresponds to a two-PIP ahead event which corresponds to a subsequent fuel injection based on crank angle position. Observer-based model 80 uses a measured throttle angle position 88 to ensure stability and compensate for any modeling inaccuracies as described in greater detail below.

The current 84 and future 86 airflow actuator position estimates are processed by a throttle body airflow model 90 to generate current 92 and future 94 estimates for mass airflow (MAF).

The current 92 and future 94 mass airflow estimates are provided to an observer-based intake manifold filling model 98 which then provides an estimate of the cylinder air charge 102 for a future fuel injection event. Manifold filing model 98 uses a current calculated air charge 102 as a feedback element to account for modeling inaccuracies. The current calculated air charge 102 is based on the measured or sensed mass airflow 96, which is also processed by manifold filling model 98.

Figure 3:
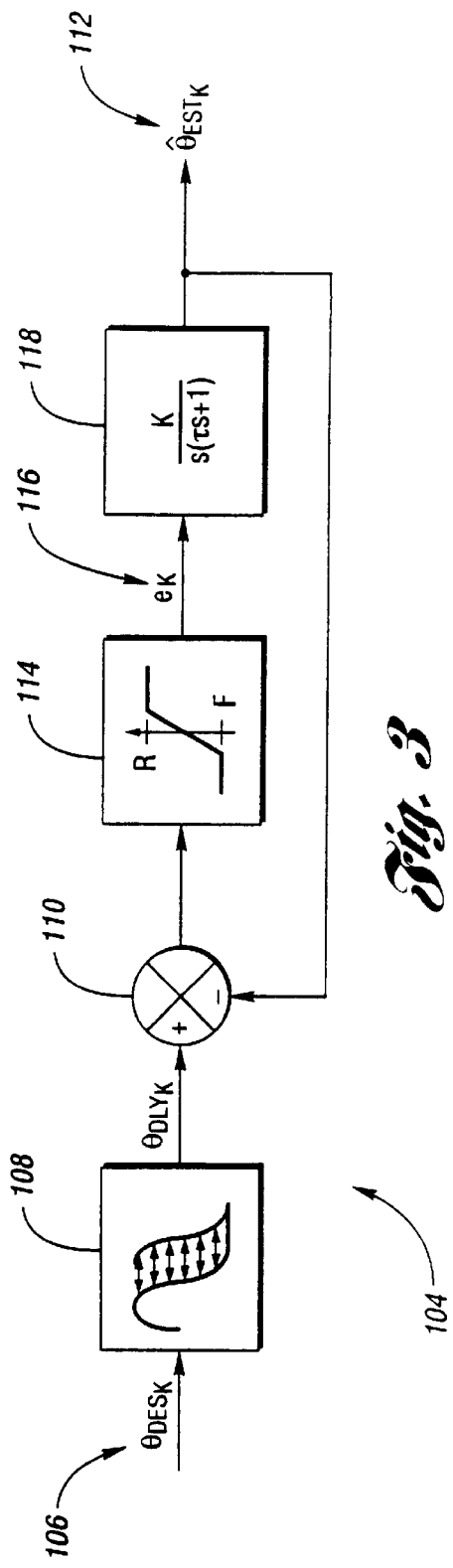
FIG. 3 is a block diagram illustrating a general dynamic model for a closed-loop electronic throttle control system for use in determining an estimated future cylinder air charge according to the present invention.

FIG. 3 is a block diagram illustrating a general dynamic model for a closed-loop ETC system for use in determining an estimated future cylinder air charge according to the present invention. Dynamic model 104 captures the dynamics of the system, i.e., the transfer function, so that a throttle angle output 112 can be predicted or estimated based on a given desired throttle angle input 106. Model 104 combines a closed-loop throttle controller and plant dynamics model. Input 106 is preferably the commanded or desired throttle angle while output 112 represents the actual throttle angle after the controller has responded. In one preferred embodiment of the present invention, the commanded or desired throttle angle 106 is generated or sampled at a predetermined time interval which is independent of the current engine rotational speed (RPM). Model 104 is non-linear and contains a transport delay 108 to model the controller delay associated with the commanded throttle angle. The estimated throttle angle position is used to provide a feedback signal which is combined at block 110 with the delayed estimated signal to provide an error or correction term. To model the motor rate-limiting effects and bias spring, a non-linear saturation element 114 with positive and negative calibratible limits R and F, respectively, is also provided and results in a rate-limited error 116. A second-order linear portion of the model 118 represents plant dynamics. Two calibratable parameters (K and τ) of linear portion 118 are functions of both the throttle controller and motor dynamics. Depending upon the particular controller gains selected and motor dynamics used, the linear portion 118 of model 104 can be further simplified as an integrator with a proportional gain. According to the present invention, model 104 is used in a recursive manner to provide current and future throttle angle estimates based on an input desired throttle angle. To provide an appropriate estimator, model 104 is discretized to provide a difference equation and algorithm for estimating the current and future throttle angle positions.

Preferably, model 104 is discretized in the crank-angle domain because air charge calculation and intake manifold filling dynamics are executed on a crank-angle domain basis. As such, the sampling interval in the resulting algorithm becomes a function of engine speed. The presence of both linear and non-linear components in model 104 requires discretizing the model in four steps: discretizing the non-linear transport delay, discretizing the non-linear rate-limiter, discretizing the linear feed-forward frequency-domain plant dynamics model, and developing an algorithm which combines all of the components of the model. The algorithm is preferably used recursively to provide one-PIP and two-PIP ahead throttle angle estimates. A closed-loop observer structure is then used for the current throttle angle estimate and one-PIP ahead throttle angle estimate to account for modeling inaccuracies and improve steady-state stability.

The first step in discretizing the model includes discretizing the transport delay 108 to support a variable sampling interval. When a desired throttle angle 106 is commanded, controller actuation does not take place until some later time. In one embodiment, the transport delay is approximately 14 milliseconds. In a discrete domain, the controller actuation delay is represented by $K_{dly}$ measurement samples. Mathematically this can be represented by:

$$\theta_{DLY}(t)=\theta_{DES}(t-t_{DLY})$$

$$\theta_{DLY}(k)=\theta_{DES}(k-k_{DLY})$$

where:

$$k_{DLY} = \frac{t_{DLY}}{T},$$

T is the sample period given by:

$$T = \frac{2}{\frac{n}{60}(N_{CYL})}$$

Since $k_{DLY}$ varies:

$$\theta_{DLY}(k) = \alpha[\theta_{DES}(k-\text{ceil}(k_{DLY}))] + \beta[\theta_{DES}(k-\text{ceil}(k_{DLY}-1))]$$

where:

$$\alpha = (k_{DLY} - \text{ceil}(k_{DLY}-1)), \text{ and } \beta = 1-\alpha$$

The use of a ceiling function (ceil (x)) ensures an actual delayed sample is, used.

For a fixed sampling interval, $K_{dly}$ is a fixed quantity. However, since the algorithm is to be executed in the crank-angle domain with a variable sampling interval based on engine speed, $K_{dly}$ is no longer a fixed quantity. Therefore, a weighted function of delayed samples of the desired throttle angle is required to account for a varying sampling interval. According to the present invention, ranges of both the sampling interval and $K_{dly}$ must be identified so that a minimum history of delayed desired throttle angle samples is used in the algorithm. For an eight-cylinder engine with engine speeds ranging between 650 and 7000 RPM, ranges of the sampling interval and $K_{dly}$ are:

$$2.1\ ms \leq T \leq 23.1\ ms$$

and $$6.667 \geq k_{DLY} \geq 0.6087$$

With this range of $K_{dly}$, a weighted function of delayed samples of the desired throttle angle that ranges from the current desired throttle angle to a desired throttle angle seven samples old should be used. Therefore, a seven-sample history of the desired throttle angle is used to integrate the transport delay (14 ms in this example) into the algorithm. Of course, the number of samples maintained in the sample history will vary depending upon the particular application, but may be determined according to the process described above.

A second step in discretizing model 104 is to discretize the non-linear rate limiter used to model the throttle motor rate limiting effects and bias spring. Using a piecewise linear relationship after calculating the error term $e_K$, which is the error between the desired and actual throttle position, the rate limiter can be discretized as follows:

$$e_K = \theta_{DLY_K} - \hat{\theta}_{EST_K}$$

where:

$$e_K = f_{ratelimit}(e_k) \begin{Bmatrix} R, \text{ if } e_k > R \\ F, \text{ if } e_K < F \\ e_K, \text{ otherwise} \end{Bmatrix}$$

The above equations are also adaptable for use when an observer is added to model 104 as illustrated and described with reference to FIGS. 4 and 5. The representations for the non-linear rate-limiter for the current throttle angle and one-PIP ahead estimates are:

$$e_K = f_{ratelimit}(e_K) + L(\theta_{ACT_{K-1}} - \hat{\theta}_{EST_{K-1}})$$

$$e_{K+1} = f_{ratelimit}(e_{K+1}) + L(\theta_{ACT_K} - \theta_{EST_K})$$

Preferably, the error is calculated after the current throttle angle is estimated.

The third step in discretizing the actuator model 104 is to discretize the feed-forward throttle control dynamics model 118. Because the model is linear, this can be accomplished using a Z-transform approach by applying any of a number of methods such as ZOH, Bilinear Transformation, Backward Euler, and the like. The Bilinear Transformation method, also known as Tustin's method, uses a trapezoidal rule for numerical integration approximation and provides a more accurate mapping of the plant dynamics in the discrete domain for an electronic throttle airflow actuator. Preferably, the Bilinear Transformation method is used because it is less sensitive to varying sampling intervals compared to other methods such as ZOH or Backward Euler methods which may introduce oscillatory and/or unstable behavior when large sampling intervals exist. The discrete domain transfer function G(z) for the frequency-domain plant dynamics model G(s) may be represented as follows:

$$G(s) = \frac{K}{s(\tau s + 1)}$$

$$G(z) = G(s)\Big|_{s=\frac{2(z-1)}{T(z-1)}}$$

$$= \frac{KT^2(z^2 + 2z + 1)}{z^2(4\tau + 2T) - 8\tau z + (4\tau - 2T)}$$

$$= \frac{\hat{\theta}_{EST}(z)}{e(z)}$$

The discrete domain transfer function is then used to derive a corresponding difference equation for $F \leq e_K \leq R$ as follows:

$$\hat{\theta}_{EST_K} = \frac{1}{(1 + b_0/a_0)}$$

$$\left[\left(\frac{b_0}{a_0}\right)\theta_{DLY_K} + \left(\frac{b_1}{a_0}\right)e_{K-1} + \left(\frac{b_2}{a_0}\right)e_{K-2} - \left(\frac{a_1}{a_0}\right)\hat{\theta}_{EST_{K-1}} - \left(\frac{a_2}{a_0}\right)\hat{\theta}_{EST_{K-2}}\right]$$

where:

$$b_0 = KT^2,\ b_1 = 2KT^2,\ b_2 = b_0,\ a_0 = (4\tau + 2T),\ a_1 = -8\tau,\ \Lambda a_2 = (4\tau - 2T)$$

For $e_K > R$, the difference equation is:

$$\hat{\theta}_{EST_K} = \left[\left(\frac{b_0}{a_0}\right)R + \left(\frac{b_1}{a_0}\right)e_{K-1} + \left(\frac{b_2}{a_0}\right)e_{K-2} - \left(\frac{a_1}{a_0}\right)\hat{\theta}_{EST_{K-1}} - \left(\frac{a_2}{a_0}\right)\hat{\theta}_{EST_{K-2}}\right]$$

and for $e_K < F$, the difference equation is:

$$\hat{\theta}_{EST_K} = \left[\left(\frac{b_0}{a_0}\right)F + \left(\frac{b_1}{a_0}\right)e_{K-1} + \left(\frac{b_2}{a_0}\right)e_{K-2} - \left(\frac{a_1}{a_0}\right)\hat{\theta}_{EST_{K-1}} - \left(\frac{a_2}{a_0}\right)\hat{\theta}_{EST_{K-2}}\right]$$

The discretized components are then combined to form an algorithm for estimating the current throttle angle based on any desired throttle angle input.

Figure 4:
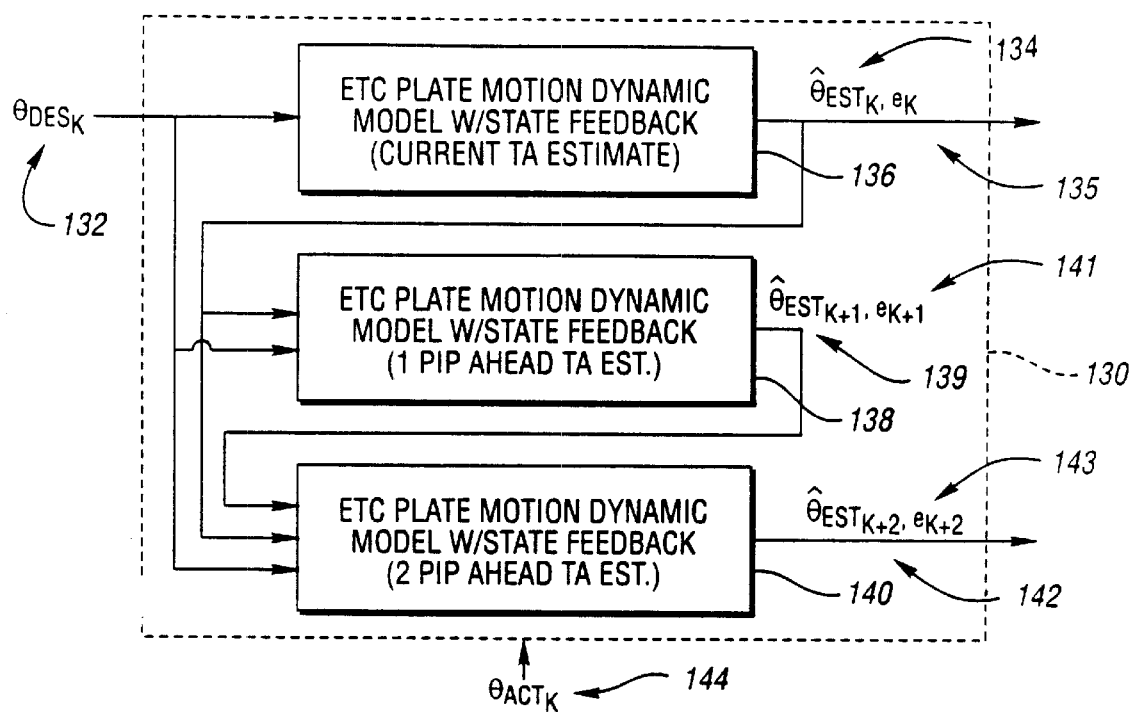
FIG. 4 is a simplified representation of a recursive airflow actuator position model for estimating current and first and second future actuator positions according to the present invention.
Figure 5:
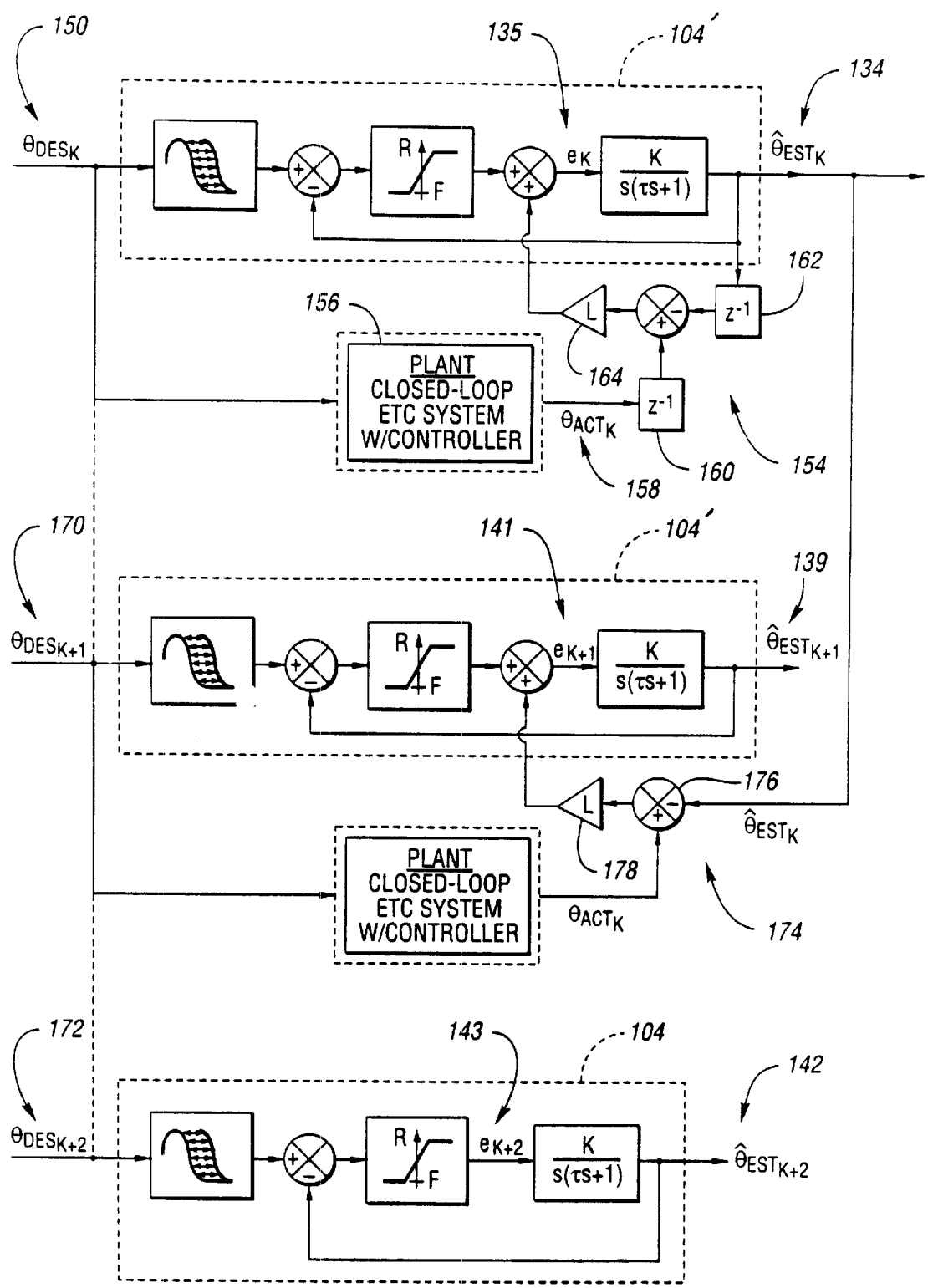
FIG. 5 is a more detailed representation of a model for estimating future airflow actuator position according to the present invention.

FIGS. 4 and 5 provide block diagrams illustrating a recursive airflow actuator position model with a closed-loop observer structure using sensed throttle plate position with a proportional gain to account for modeling inaccuracies and to ensure correct prediction of throttle plate position. FIG. 4 provides a simplified representation of the recursive airflow actuator position model for estimating current throttle valve position, and first and second future throttle valve positions according to the present invention. Recursive model 130 includes a desired throttle valve position 132 as an input. As described above, the desired or commanded throttle valve angle is sampled or provided on a predetermined (fixed) sampling interval. Relative to the crank-angle domain, the desired throttle valve position is considered to be constant for the current, and two future events. The desired throttle valve position 132 is used to provide an estimated current position 134 with an associated error 135 based on the ETC plate motion dynamic model 136. Outputs 134 and 135 are provided recursively to blocks 138 and 140. The current estimated throttle position 134 is used to predict a first future estimated throttle position 139 using block 138. An associated future error value 141 is also provided. As such, block 138 provides an estimated airflow actuator position for a first future engine event (fuel injection or intake event in this example) based on a current estimated position. The first future estimated position value is provided as an input to block 140 to generate a second future estimated position value 142 and associated error 143. In one preferred embodiment, the second future estimated value 142 is determined for a two-PIP ahead throttle angle estimate. A measured value 144 corresponding to the current throttle valve position provides feedback to model 130 to account for modeling inaccuracies and ensure correct prediction of future throttle plate positions as best illustrated in FIG. 5.

A more detailed representation of a recursive observer-based model for estimating future airflow actuator position according to the present invention is illustrated in FIG. 5. A closed-loop observer structure 154 is added to the dynamic throttle position model 104' using a measured or sensed throttle position 158 provided by the closed-loop ETC system controller 156 as a feedback signal. The measured signal is time shifted as represented by block 160 and compared with the current estimate 134, which is time shifted as represented by block 162, to generate an error or difference signal. A proportional gain 164 is applied and used to adjust or modify model 104 based on an error or correction factor 135.

The desired throttle valve position for a first future event 170 is provided as an input to another instance of model 104' to predict a first future estimated position 139. As illustrated by the broken line, the future desired value may be assumed to be equal to the current desired value 150 and the second future desired value 172 for most applications. Input 170 is processed by model 104 to determine a first future estimated value for throttle position 139. The current estimated value 134 is used by an observer structure 174 to account for modeling errors and provide a feedback signal based on the current actual throttle valve position at block 176. A proportional gain 178 is applied and the error 141 is added to the model 104'.

Similarly, a desired throttle valve position for a second future event 172 is processed by model 104 to determine an estimated throttle angle position for a second future event 142 with an associated feedback error 143.

The closed-loop observer structures 154 and 174 of FIG. 5 are used only for the current and first future estimate for throttle angle position and not for the second future estimate. To use a closed-loop observer structure for the second future event would require a sensed throttle position for the second future event which is not available. However, the feedback provided for the current and first future estimates is dynamically coupled with the second future estimate. As such, the second future estimate will be improved as a result of integrating (combining) a closed-loop observer with the current and first future estimates.

In one embodiment, the present invention executes a recursive algorithm assuming that the desired throttle angle is the same for the current, first future event, and second future event. This assumption is valid so long as the intake events occur at a faster rate than the update rate of the desired throttle angle. In situations where this assumption is not valid, the closed-loop observer structure illustrated in FIGS. 4 and 5 will make appropriate corrections. One implementation for a recursive algorithm according to the present invention is as follows:

$$\hat{\theta}_{EST_K} = \frac{1}{(1+b_0/a_0)}$$

$$\left[\left(\frac{b_0}{a_0}\right)\theta_{DLY_K} + \left(\frac{b_1}{a_0}\right)e_{K-1} + \left(\frac{b_2}{a_0}\right)e_{K-2} - \left(\frac{a_1}{a_0}\right)\hat{\theta}_{EST_{K-1}} - \left(\frac{a_2}{a_0}\right)\hat{\theta}_{EST_{K-2}}\right]$$

For $e_K > R$, $$\hat{\theta}_{EST_K} = \left[\left(\frac{b_0}{a_0}\right)R + \left(\frac{b_1}{a_0}\right)e_{K-1} + \left(\frac{b_2}{a_0}\right)e_{K-2} - \left(\frac{a_1}{a_0}\right)\hat{\theta}_{EST_{K-1}} - \left(\frac{a_2}{a_0}\right)\hat{\theta}_{EST_{K-2}}\right]$$

and for $e_K < F$, $$\hat{\theta}_{EST_K} = \left[\left(\frac{b_0}{a_0}\right)F + \left(\frac{b_1}{a_0}\right)e_{K-1} + \left(\frac{b_2}{a_0}\right)e_{K-2} - \left(\frac{a_1}{a_0}\right)\hat{\theta}_{EST_{K-1}} - \left(\frac{a_2}{a_0}\right)\hat{\theta}_{EST_{K-2}}\right]$$

where $$e_K = f_{ratelimit}(\theta_{DLY_K} - \hat{\theta}_{EST_K}) + L(\theta_{ACT_{K-1}} - \hat{\theta}_{EST_{K-1}})$$

For the first and second future position values assuming constant desired values and constant delay values (equal to the current desired value and current delay value), the first future position value is given by:

$$\hat{\theta}_{EST_{K+1}} = \frac{1}{(1+b_0/a_0)}\left[\left(\frac{b_0}{a_0}\right)\theta_{DLY_{K+1}} + \left(\frac{b_1}{a_0}\right)e_K + \left(\frac{b_2}{a_0}\right)e_{K-1} - \left(\frac{a_1}{a_0}\right)\hat{\theta}_{EST_K} - \left(\frac{a_2}{a_0}\right)\hat{\theta}_{EST_{K-1}}\right]$$

For $e_{K+1} > R$, $$\hat{\theta}_{EST_{K+1}} = \left[\left(\frac{b_0}{a_0}\right)R + \left(\frac{b_1}{a_0}\right)e_K + \left(\frac{b_2}{a_0}\right)e_{K-1} - \left(\frac{a_1}{a_0}\right)\hat{\theta}_{EST_K} - 1\left(\frac{a_2}{a_0}\right)\hat{\theta}_{EST_{K-1}}\right]$$

and for $e_{K+1} < F$, $$\hat{\theta}_{EST_{K+1}} = \left[\left(\frac{b_0}{a_0}\right)F + \left(\frac{b_1}{a_0}\right)e_K + \left(\frac{b_2}{a_0}\right)e_{K-1} - \left(\frac{a_1}{a_0}\right)\hat{\theta}_{EST_K} - \left(\frac{a_2}{a_0}\right)\hat{\theta}_{EST_{K-1}}\right]$$

where $$e_{K-1} = f_{ratelimit}(\theta_{DLY_{K-1}} - \hat{\theta}_{EST_{K+1}}) + L(\theta_{ACT_K} - \hat{\theta}_{EST_K})$$

For the second future position value of the throttle valve, $$\hat{\theta}_{EST_{K+2}} = \frac{1}{(1+b_0/a_0)}$$

$$\left[\left(\frac{b_0}{a_0}\right)\theta_{DLY_{K+2}} + \left(\frac{b_1}{a_0}\right)e_{K+1} + \left(\frac{b_2}{a_0}\right)e_K - \left(\frac{a_1}{a_0}\right)\hat{\theta}_{EST_{K+1}} - \left(\frac{a_2}{a_0}\right)\hat{\theta}_{EST_K}\right]$$

For $e_{K+2} > R$, $$\hat{\theta}_{EST_{K+2}} = \left[\left(\frac{b_0}{a_0}\right)R + \left(\frac{b_1}{a_0}\right)e_{K+1} + \left(\frac{b_2}{a_0}\right)e_K - \left(\frac{a_1}{a_0}\right)\hat{\theta}_{EST_{K+1}} - \left(\frac{a_2}{a_0}\right)\hat{\theta}_{EST_K}\right]$$

and for $e_{K+2} < F$, $$\hat{\theta}_{EST_{K+2}} = \left\{\left(\frac{b_0}{a_0}\right)F + \left(\frac{b_1}{a_0}\right)e_{K+1} + \left(\frac{b_2}{a_0}\right)e_K - \left(\frac{a_1}{a_0}\right)\hat{\theta}_{EST_{K+1}} - \left(\frac{a_2}{a_0}\right)\hat{\theta}_{EST_K}\right\}$$

where:

$$e_{k+2} = f_{ratelimit}(\theta_{DLY_{K+2}} - \hat{\theta}_{EST_{K+2}})$$

Figure 6:
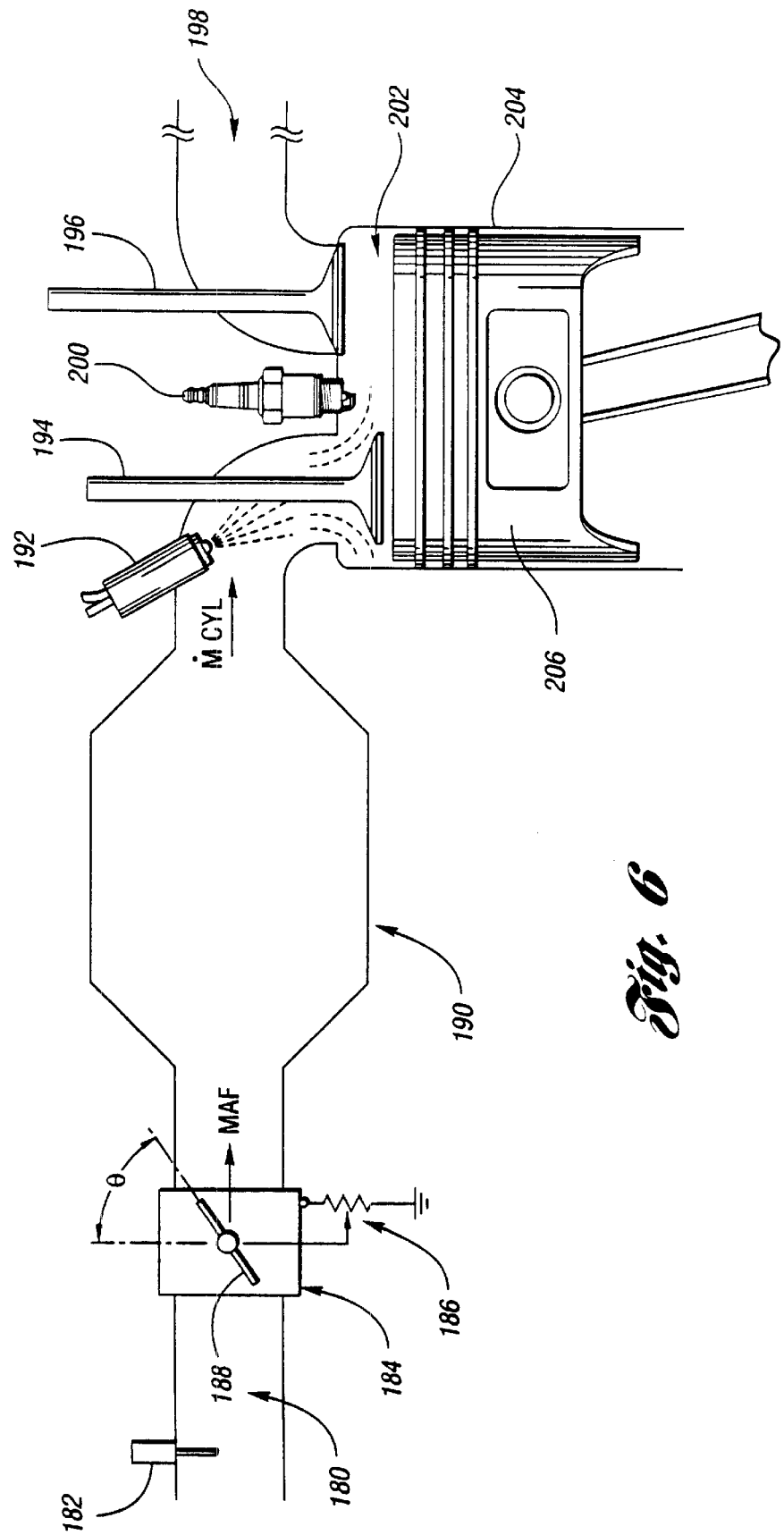
FIG. 6 is a block diagram illustrating estimation of intake airflow and manifold filling based on estimated throttle plate angle according to one embodiment of the present invention.

FIG. 6 is a block diagram illustrating estimation of intake airflow and manifold filling effects based on estimated throttle plate angle according to one embodiment of the present invention. Once the current and future throttle plate angles are estimated as described above, the present invention utilizes an airflow model based on the actuator positions in conjunction with an intake manifold filling model to predict the in-cylinder air charge for a future injection event. Depending upon the particular engine technology and airflow actuator, the intake manifold filling model may be modified or eliminated. For example, for applications using variable valve timing with a throttle-less engine, the actuator position model and/or airflow model may incorporate the manifold filling effects. Likewise, any two or more of the models may be combined with appropriate modifications without departing from the spirit or scope of the present invention.

In one preferred embodiment, an electronically controlled throttle valve is used alone or in conjunction with controllable valve timing to provide airflow control. As such, the current and future throttle plate angles are used in an adaptive throttle body airflow model to provide corresponding current and future estimates of mass airflow into the intake manifold 190. To account for modeling inaccuracies, a future delta MAF is generated by taking the difference of the current and future estimated mass airflows. The future delta mass airflow is then used as a feed-forward term with the sensed mass airflow.

An unadapted throttle body mass airflow model may be based on the following adiabatic orifice flow equations:

$$MAF = C_D A_{th} P_{atm} \sqrt{\frac{2\kappa}{\kappa-1}\left[\left(\frac{P_{man}}{P_{atm}}\right)^{\frac{2}{\kappa}} - \left(\frac{P_{man}}{P_{atm}}\right)^{\frac{\kappa+1}{\kappa}}\right] \cdot \frac{M}{RT}}$$

for $\frac{P_{man}}{P_{atm}} > \left(\frac{2}{\kappa+1}\right)^{\frac{\kappa}{\kappa-1}}$ and $$MAF = C_D A_{th} P_{atm} \sqrt{\kappa\left[\left(\frac{2}{\kappa+1}\right)^{\frac{\kappa+1}{\kappa-1}}\right] \frac{M}{RT}} \text{ for }$$

$$\frac{P_{man}}{P_{atm}} \leq \left(\frac{2}{\kappa+1}\right)^{\frac{\kappa}{\kappa-1}}$$

where $C_D$ represents discharge coefficient (determined empirically), $A_{th}$ represents effective throttle flow area, $_{atm}$ represents atmospheric pressure, $_{man}$ represents downstream intake manifold pressure, represents ratio of specific heats, M represents molecular weight of gas, T represents upstream temperature of air charge, $\overline{R}$ represents ideal gas constant, and MAF represents mass airflow entering the throttle body.

These equations are highly non-linear and are preferably regressed from empirical mapping data based on a particular size of throttle body or throttle plate. Preferably, the mass airflow model includes inputs corresponding to current barometric (atmospheric) pressure (BP), air charge temperature (ACT), intake manifold pressure (MAP), and throttle angle. For the first and second future mass airflow estimates, the intake manifold pressure and air charge temperature are assumed to be the same as the current values. In one preferred embodiment, intake manifold pressure corresponds to a desired manifold pressure commanded by the electronic throttle controller rather than an actual measured or sensed value. These assumptions are valid for air charge estimation purposes with any inaccuracies removed because only a delta mass airflow is to be generated.

With reference to FIG. 6, air is inducted through intake 180 and passes by mass airflow sensor 182 before entering throttle body 184. Intake air is modulated by position of throttle plate 188 with a measured or sensed position determined by throttle plate position sensor 186. Air passing through throttle body 184 enters intake manifold 190 where it is distributed to the various cylinders 204. Fuel injector 192 injects an appropriate quantity of fuel which is entrained as the air passes into cylinder 202 upon the opening of intake valve (or valves) 194. Intake valve 194 is closed as piston 206 rises during the compression stroke. An appropriate signal is provided to spark plug 200 for combustion to occur within chamber 202. Exhaust valve (or valves) 196 is then opened and the combusted gases pass into exhaust manifold 198. According to the present invention, air/fuel ratio control is improved by estimating position of throttle plate 188 to determine airflow into intake manifold 190. Any modeling errors are canceled out and are compensated for using feedback provided by throttle position sensor 186 and by using the models to estimate a delta mass airflow. A manifold filling model is used to provide an estimate of the air charge entering combustion chamber 202 from manifold 190 during the subsequent intake event when intake valve 194 is open and an air/fuel mixture is provided to chamber 202.

Figure 7:
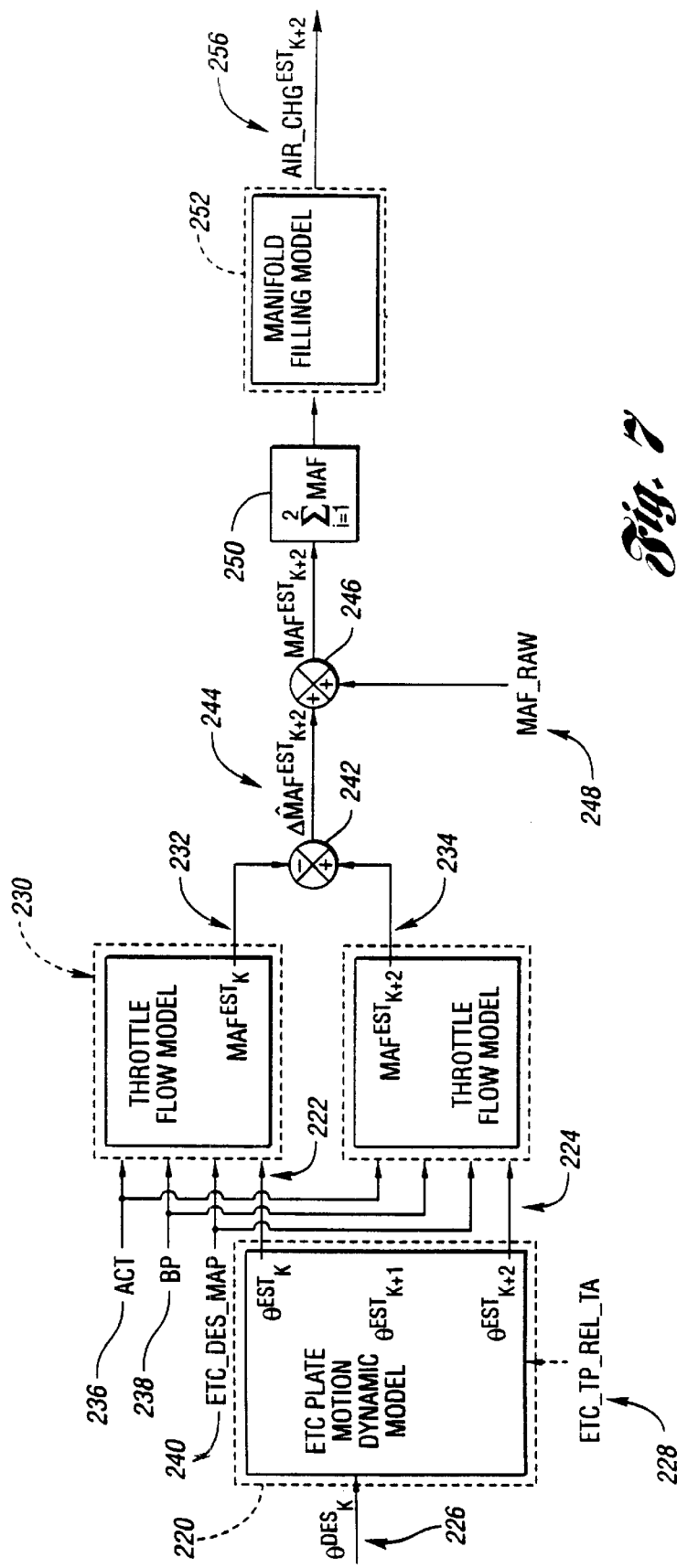
FIG. 7 is a block diagram illustrating a control system implementing feed-forward observer-based control according to one embodiment of the present invention.

A block diagram illustrating one embodiment for a control system with feed-forward observer-based controls for future in-cylinder air charge estimation according to the present invention is shown in FIG. 7. The ETC plate motion dynamic model 220 is used in conjunction with an airflow model 230 and manifold filling model 252 to estimate or predict the in-cylinder air charge 256 for a future engine event, such as an intake or fuel injection event. A desired throttle angle 226 is used to generate a current estimate 222 and a future estimate 224 of the throttle plate position. Feedback 228 is provided by measuring or sensing position of the throttle valve and adjusting model 220 accordingly.

Throttle flow model 230 uses the current and estimated throttle valve positions 222 and 224, respectively, along with air charge temperature 236, barometric pressure 238, and desired intake manifold pressure 240 to generate estimates for the current mass airflow (MAF) 232 and a future mass airflow 234. The difference between the current and future estimated mass airflow values is determined at 242 to generate a future delta mass airflow estimate 244. This result provides a feed-forward delta mass airflow prediction to be added to the current mass airflow reading 248 at block 246. Block 250 integrates the result to produce a current intake air charge which is then provided directly to an intake manifold filling model 252 for a final in-cylinder air charge estimate 256 for a future engine event. In one preferred embodiment of the present invention, the engine event corresponds to a fuel injection event with the estimated air charge 256 being used by the fuel control to schedule an appropriate fuel quantity to achieve the desired air/fuel ratio.

By using the same throttle flow model 230 to process the current 222 and future 224 estimated throttle valve positions, and taking the difference of the predicted mass airflow at block 242, most modeling errors are canceled whether induced by the ETC plate motion dynamic model 220 or the throttle flow model 230.

Intake manifold filling model 252 is used to account for filling effects during transients which would otherwise lead to undesirable air/fuel ratio excursions. During transients, the difference between the sensed mass airflow and the in-cylinder airflow is equal to the rate of change of the air mass in the intake manifold. Under steady-state conditions, the sensed mass airflow is equal to the in-cylinder airflow. Treating the engine as a volumetric pump, using the ideal gas law, and applying conservation of mass to the intake manifold, the manifold filling dynamics can be represented as:

$$\dot{M}_{MAN} = MAF - \dot{M}_{CYL} \Rightarrow \frac{\dot{P}_{MAN}V_{MAN}}{RT_{MAN}} = MAF - \frac{\eta_v P_{MAN} V_d n}{120 RT_{MAN}}$$

in the frequency domain, this is represented as:

$$\frac{M_{CYL}(s)}{MAF(s)} = \frac{1}{\tau_{MAN}s + 1}, \text{ where } \tau_{MAN} = 120\frac{V_{MAN}}{\eta_v V_D n}$$

Discretizing the frequency domain transfer function above into the crank angle domain leads to:

$$M_{CYL_K} = (1-air\_fk)M_{CYL_{K-1}} + MAF_K(air\_fk)$$

where air_fk can be approximated as:

$$\frac{\eta_V V_D}{N_{CYL} V_{MAN}}$$

and where MAF represents mass airflow past the throttle body, $M_{CYL}$ represents mass airflow into the cylinder, $M_{MAN}$ represents rate of change of mass airflow in the intake manifold, $P_{MAN}$ represents intake manifold pressure, $V_{MAN}$ represents intake manifold displacement volume, $T_{MAN}$ represents intake manifold temperature, R represents gas constant, $V_D$ represents cylinder displacement volume, $_v$ represents volumetric efficiency, n represents engine speed (RPM), and $T_{MAN}$ represents a manifold filling time constant.

Figure 8:
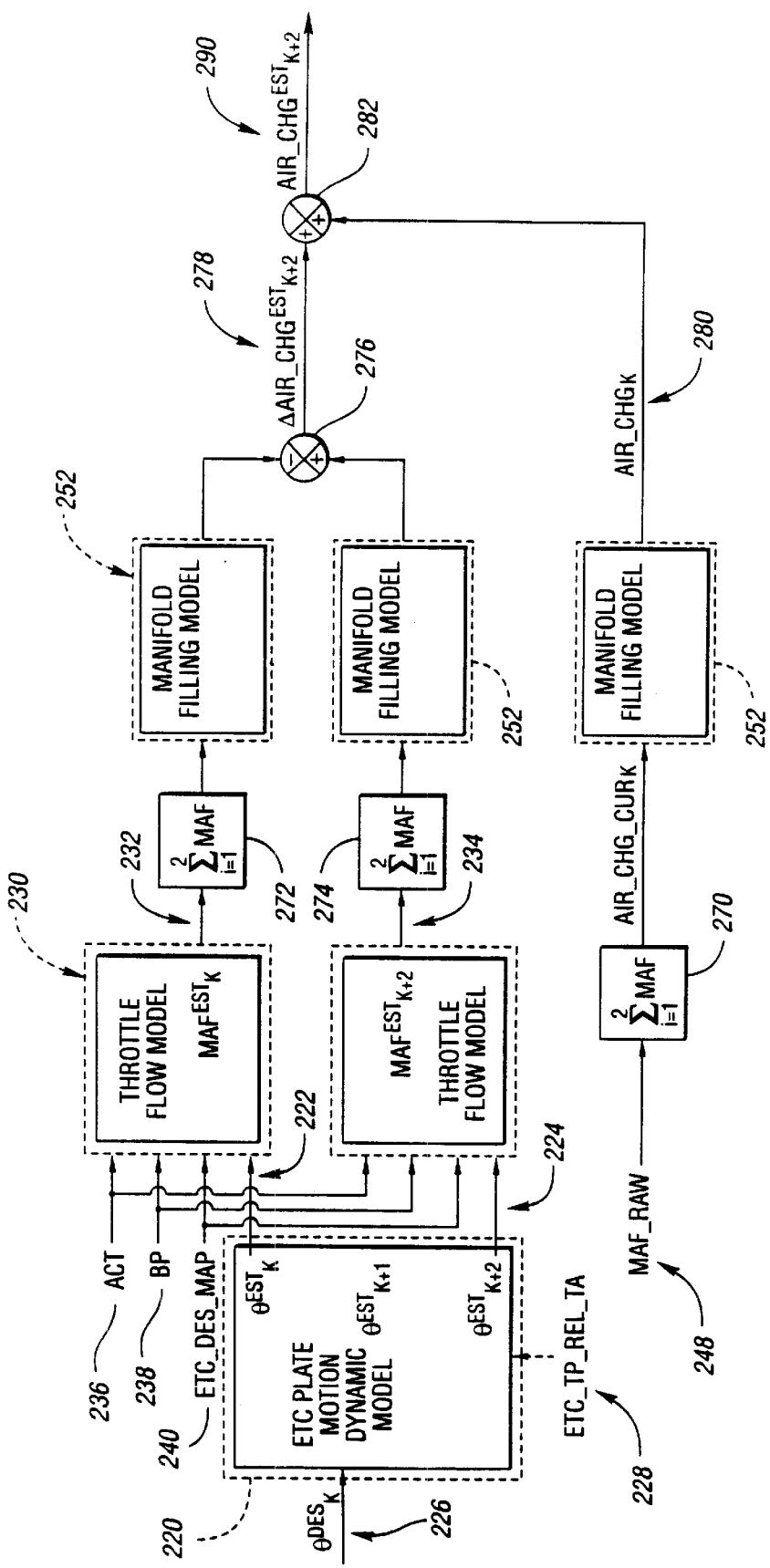
FIG. 8 is a block diagram illustrating a control system implementing feed-forward observer-based control according to another embodiment of the present invention.

Another embodiment of a feed-forward observer-based control according to the present invention is illustrated in FIG. 8. Similar to the embodiment illustrated in FIG. 7, the embodiment of FIG. 8 includes an ETC plate motion model 220 which generates estimates for a current 222 and future 224 throttle plate position corresponding to a desired 226 throttle plate position. Feedback 228 is provided based on a sensed or measured throttle plate position. Current estimate 222 is provided to throttle flow model 230 along with future estimate 224. Air charge temperature (ACT) 236, barometric pressure (BP) 238, and desired, estimated, or measured manifold absolute pressure (ETC_DES_MAP) 240 are used by throttle flow model 230 in generating a current MAF estimate 232 and a future MAF estimate 234.

The current and future MAF estimates are integrated as indicated at 272 and 274 prior to being processed by manifold filling model 252. Based on the current MAF estimate, manifold filling model 252 generates a corresponding air charge estimate which is combined with an air charge estimate based on the future estimated MAF at block 276. A differential future air charge estimate 278 is produced and used as a feed-forward term at 282 where it is combined with air charge 280 calculated based on MAF sensor signal 248 after passing through integrator 270 and being processed by manifold filling model. 252. The resulting air charge estimate for in-cylinder air charge at a future engine event, represented generally by reference numeral 290, may then be used to schedule an appropriate amount of fuel to more precisely control air/fuel ratio.

Similar to the embodiment illustrated in FIG. 7, the embodiment of FIG. 8 eliminates modeling errors induced by ETC plate motion model 220, throttle flow model 230, and manifold filling model 252 through the difference operation represented by block 276. As will be appreciated by those skilled in the art, the differencing operation effectively cancels any modeling error since the error will be present for both the current and future estimated values. The resulting delta air charge 278 may then be used as a feed-forward term to improve the responsiveness of the control system.

Figure 9:
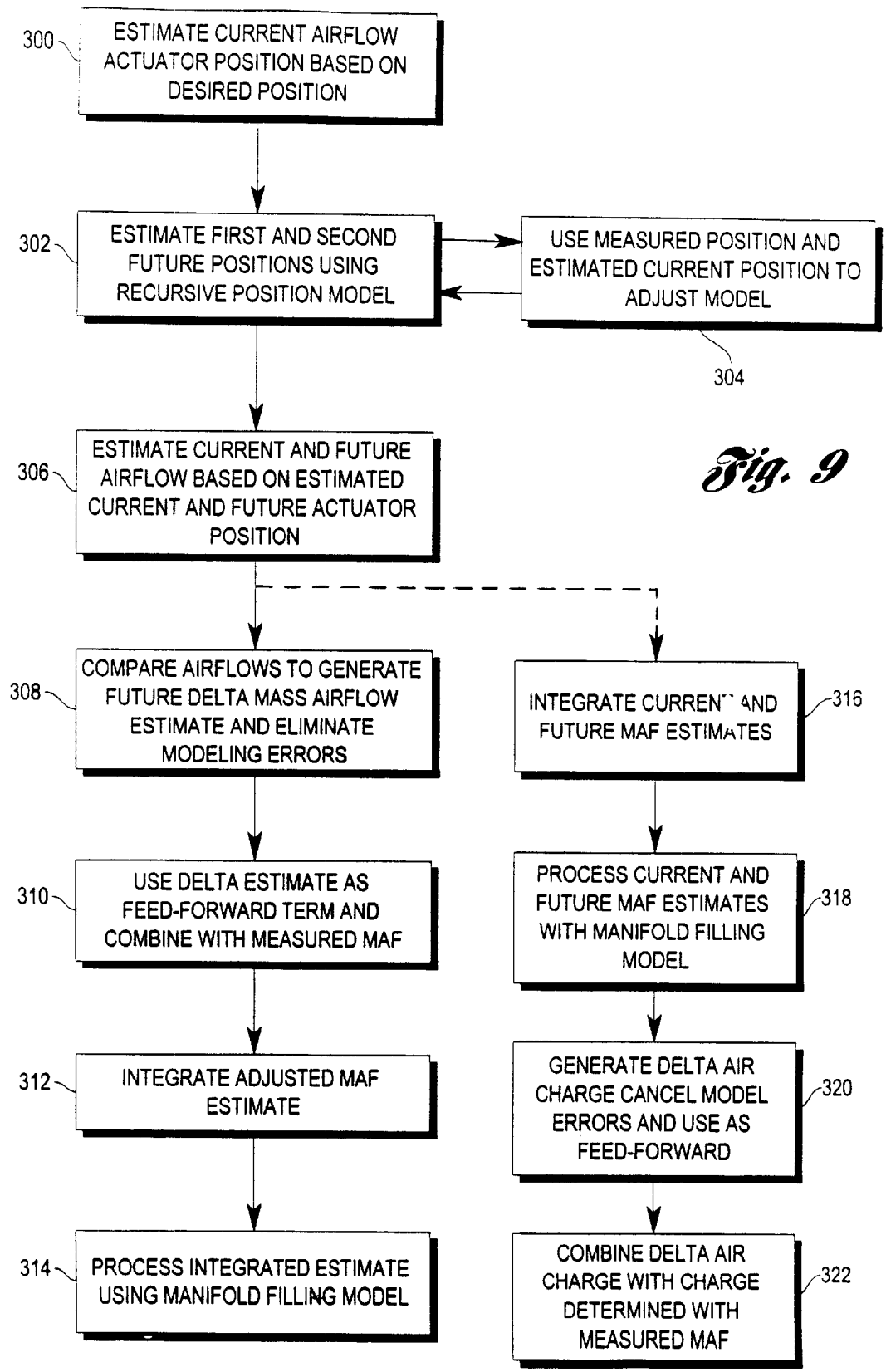
FIG. 9 is a flowchart illustrating operation of one embodiment of a system or method for feed-forward observer-based air charge estimation according to the present invention.

FIG. 9 provides a flowchart illustrating operation of two embodiments for a system and method for air charge estimation according to the present invention. The diagram of FIG. 9 represents control logic of one embodiment of a system or method according to the present invention. As will be appreciated by one of ordinary skill in the art, the diagrams of the various Figures may represent any one or more of a number of known processing strategies such as event-driven, interrupt-driven, multi-tasking, muti-threading, and the like. As described above, the present invention preferably utilizes both an event-driven strategy triggered by a particular event, i.e., intake or fuel injection corresponding to a particular crank angle, in combination with time-domain, fixed-interval interrupt processing, such as used for calculation of a desired throttle angle, for example. Thus, various steps or functions illustrated may be performed in the sequence illustrated, in parallel, or in some cases omitted. Likewise, the order of processing is not necessarily required to achieve the objects, features, and advantages of the present invention, but is provided for ease of illustration and description. Although not explicitly illustrated in FIG. 9, one of ordinary skill in the art will recognize that one or more of the illustrated steps or functions may be repeatedly performed depending upon the particular function and the processing strategy being used.

Preferably, the control logic illustrated in FIG. 9 is primarily implemented in software which is executed by a microprocessor-based engine controller. Of course, the control logic may be implemented in software, hardware, or a combination of software and hardware depending upon the particular application. When implemented in software, the control logic is preferably provided in a computer-readable storage medium and in stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, parameters, and the like.

In the embodiment of FIG. 9, block 300 represents estimating a current airflow actuator position based on a current desired position. First and second future positions are estimated as represented by block 302 using a recursive actuator position model as described in detail above. In one embodiment, the first and second future positions are estimated assuming the desired position remains constant. A corresponding measured position is used along with at least one of the first and second future positions to adjust the model as indicated by block 304. Current and future estimates for mass airflow based on estimated current and future actuator positions, respectively, are determined as represented by block 306.

Blocks 308–314 represent a first embodiment using feed-forward observer-based control according to the present invention. Blocks 316–322 represent an alternative embodiment for feed-forward observer-based control according to the present invention. As represented by block 308, the current and future airflows are compared to generate a future delta mass airflow estimate. The future delta mass airflow estimate eliminates most modeling errors which may be present in either the actuator position model or the airflow model used to determine the current and future mass airflow values. The delta mass airflow estimate is used as a feed-forward term and combined with a measured mass airflow value (MAF) as represented by block 310. This provides an adjusted MAF estimate which is then integrated as indicated at block 312. The integrated adjusted estimate is processed using a manifold filling model as represented by block 314 to determine the future in-cylinder air charge.

One alternative embodiment is illustrated with reference to blocks 316–322. Rather than combining the current and future estimated airflows at block 308, block 316 integrates the current and future MAF estimates and processes each separately using the manifold filling model as represented by block 318. The resulting current and future air charge estimates provided by the manifold filling model are used to generate a delta air charge. The delta air charge cancels most modeling errors induced by the airflow actuator model, the airflow model, and/or the manifold filling model. The delta air charge value is used as a feed-forward term as represented by block 320. The feed-forward term is combined with an air charge determined using the manifold filling model with a measured MAF.

As such, the present invention provides various systems and methods for feed-forward observer-based controls to estimate the in-cylinder air charge for a future engine event, such as a cylinder intake and/or injection event. According to the present invention, modeling errors are eliminated without the need for adaptive controls which may require increased development, validation, and testing resources in comparison.

While the best mode for carrying out the invention has been described in detail, those familiar with the art to which this invention relates will recognize various alternative designs and embodiments for practicing the invention as defined by the following claims.

What is claimed is:

1. A method for improving air/fuel ratio control in an internal combustion engine having an electronically controlled throttle valve to control intake airflow, the method comprising:

estimating a current throttle valve position and a future throttle valve position based on a desired throttle valve position using a throttle valve motion model with feedback from a sensed position of the throttle valve;

determining an estimated current mass airflow and future mass airflow based on the estimated current and future throttle valve positions, respectively;

combining the estimated current and future mass airflows to generate a future delta mass airflow estimate;

combining the future delta mass airflow estimate with a value representing a measured mass airflow to generate an adjusted future mass airflow estimate; and determining a future in-cylinder air charge based on the adjusted future mass airflow estimate.

2. The method of claim 1 wherein the step of estimating a current throttle valve position and a future throttle valve position comprises:

estimating a current throttle valve position based on a current desired throttle valve command;

using the estimated current throttle valve position to generate a first future throttle valve position corresponding to a first subsequent fuel injection event; and generating a second future throttle valve position estimate based on the first future throttle valve position estimate.

3. The method of claim 1 wherein the step of determining an estimated current mass airflow and an estimated future mass airflow comprises:

determining an estimated current mass airflow based on the estimated current throttle valve position; and determining an estimated future mass airflow based on the second future throttle valve position estimate.

4. The method of claim 3 wherein the steps of determining estimated current and future mass airflow comprise estimating current and future mass airflow based on current air charge temperature, barometric pressure, and manifold pressure.

5. The method of claim 1 wherein the step of determining a future in-cylinder air charge comprises processing the adjusted future mass airflow estimate to account for manifold filling effects.

6. The method of claim 5 further comprising integrating the adjusted future mass airflow estimate prior to processing to account for manifold filling effects.

7. A method for improving air/fuel ratio control in an internal combustion engine having an electronically controlled throttle valve, the method comprising:

estimating current and future positions of the throttle valve using a throttle valve position model;

estimating current and future mass airflow corresponding to the current and future position estimates of the throttle valve, respectively;

determining a current estimated in-cylinder air charge and a future estimated in-cylinder air charge based on the current and future mass airflow estimates, respectively;

comparing the current and future estimated in-cylinder air charge to generate a future delta air charge; and determining a final future estimated air charge based on the future delta air charge.

8. The method of claim 7 wherein the step of determining a final future estimated air charge comprises:

determining a measured cylinder air charge based on a measured mass airflow using a manifold filling model; and adding the measured cylinder air charge to the future delta air charge to determine the final future estimated air charge.

9. The method of claim 7 wherein the step of estimating a current throttle valve position and a future throttle valve position comprises:

estimating a current throttle valve position based on a current desired throttle valve command;

using the estimated current throttle valve position to generate a first future throttle valve position corresponding to a first subsequent fuel injection event; and generating a second future throttle valve position estimate based on the first future throttle valve position estimate.

10. The method of claim 7 further comprising integrating the current mass airflow estimate and the future mass airflow estimate.

11. The method of claim 7 wherein the step of estimating current and future mass airflow comprising estimating current and future mass airflow based on current air charge temperature, barometric pressure, and manifold pressure.

12. A system for controlling an internal combustion engine to improve air/fuel ratio control by estimating future in-cylinder air charge, the system comprising:

an airflow actuator for modulating intake air into the internal combustion engine;

a mass airflow sensor for measuring mass airflow through an intake passage into the internal combustion engine;

a position sensor for measuring position of the airflow actuator; and a controller in communication with the airflow actuator, the mass airflow sensor, and the position sensor, the controller estimating current and future positions of the airflow actuator using an actuator model, adjusting the actuator model based on at least one of the current and future position estimates and a measured position based on a signal provided by the position sensor, estimating current and future mass airflow values corresponding to the current and future position estimates, and combining the difference between the current and future airflow values with a sensed airflow value based on a signal provided by the mass airflow sensor to estimate the future in-cylinder air charge.

13. The system of claim 12 wherein the controller combines the current and future airflow values by estimating a current and future in-cylinder air charge based on the current and future mass airflow estimates, respectively, compares the current and future in-cylinder air charge to generate a future delta air charge estimate, and combines the future delta air charge estimate with an air charge based on a measured mass airflow to determine a final estimate for the future in-cylinder air charge.

14. The system of claim 12 wherein the controller combines the current and future airflow values to generate a future estimated delta mass airflow, and processes the future estimated delta mass airflow to determine the future in-cylinder air charge.

15. The system of claim 14 wherein the controller processes the future estimated delta mass airflow by combining a measured mass airflow value with the future estimated delta mass airflow.

* * * * *